US009319703B2

(12) United States Patent
Wang

(10) Patent No.: US 9,319,703 B2
(45) Date of Patent: Apr. 19, 2016

(54) HYPOTHETICAL REFERENCE DECODER PARAMETER SYNTAX STRUCTURE

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 13/954,712

(22) Filed: Jul. 30, 2013

(65) Prior Publication Data
US 2014/0098895 A1 Apr. 10, 2014

Related U.S. Application Data

(60) Provisional application No. 61/711,098, filed on Oct. 8, 2012.

(51) Int. Cl.
*H04N 7/26* (2006.01)
*H04N 19/46* (2014.01)
*H04N 19/70* (2014.01)
*H04N 19/30* (2014.01)
*H04N 19/463* (2014.01)

(52) U.S. Cl.
CPC ......... *H04N 19/46* (2014.11); *H04N 19/00545* (2013.01); *H04N 19/30* (2014.11); *H04N 19/463* (2014.11); *H04N 19/70* (2014.11)

(58) Field of Classification Search
None
See application file for complete search history.

(56) References Cited

U.S. PATENT DOCUMENTS 8,989,508 B2 * 3/2015 Deshpande ............ H04N 19/70
348/384.1
9,049,427 B2 6/2015 Hattori
(Continued)

FOREIGN PATENT DOCUMENTS

TW 262619 B 11/1995
TW I259378 B 8/2006
(Continued)

OTHER PUBLICATIONS

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
(Continued)

*Primary Examiner* — Sath V Perungavoor
*Assistant Examiner* — Janese Duley
(74) *Attorney, Agent, or Firm* — Shumaker & Sieffert, P.A.

(57) ABSTRACT

A video encoder signals, in an encoded video bitstream, a video parameter set (VPS) that includes a plurality of Hypothetical Reference Decoder (HRD) parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of the encoded video bitstream. The common set of HRD parameters is common to all sub-layers of the encoded video bitstream. A video decoder or other device decodes, from the encoded video bitstream, the VPS and performs an operation using the HRD parameters of at least one of the HRD parameter syntax structures.

36 Claims, 9 Drawing Sheets

(56) References Cited

U.S. PATENT DOCUMENTS

| | | |
|---|---|---|
| 2007/0086521 A1 | 4/2007 | Wang et al. |
| 2007/0110150 A1 | 5/2007 | Wang et al. |
| 2007/0230564 A1 | 10/2007 | Chen et al. |
| 2008/0013620 A1 | 1/2008 | Hannuksela et al. |
| 2008/0089411 A1 | 4/2008 | Wenger et al. |
| 2008/0095228 A1 | 4/2008 | Hannuksela et al. |
| 2008/0260047 A1 | 10/2008 | Hannuksela et al. |
| 2009/0003439 A1 | 1/2009 | Wang et al. |
| 2009/0225870 A1 | 9/2009 | Narasimhan |
| 2009/0296821 A1 | 12/2009 | Henocq et al. |
| 2010/0034254 A1 | 2/2010 | Wang |
| 2010/0074340 A1 | 3/2010 | Luo et al. |
| 2010/0142613 A1 | 6/2010 | Zhu |
| 2010/0153395 A1 | 6/2010 | Hannuksela et al. |
| 2011/0032999 A1 | 2/2011 | Chen et al. |
| 2012/0023249 A1 | 1/2012 | Chen et al. |
| 2012/0044322 A1 | 2/2012 | Tian et al. |
| 2013/0060911 A1 | 3/2013 | Nagaraj et al. |
| 2013/0191550 A1 | 7/2013 | Hannuksela |
| 2013/0342644 A1 | 12/2013 | Rusanovskyy et al. |
| 2014/0086336 A1 | 3/2014 | Wang |

FOREIGN PATENT DOCUMENTS

| | | |
|---|---|---|
| TW | I327306 B | 7/2010 |
| TW | I346485 | 8/2011 |
| WO | 2006111294 | 10/2006 |
| WO | 2008007337 A2 | 1/2008 |
| WO | 2008046243 A1 | 4/2008 |
| WO | 2010021665 A1 | 2/2010 |
| WO | 2013030458 A1 | 3/2013 |

OTHER PUBLICATIONS

Bross et al: "Proposed Editorial Improvements for High efficiency video coding (HEVC) Text Specification Draft 8", JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0030, XP030112962, 277 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Deshpande et al., "An Improved Hypothetical Reference Decoder for HEVC," Proc. SPIE 8666, Visual Information Processing and Communication IV, Feb. 21, 2013, pp. 866608-1 to 866608-9, vol. 8666.

Deshpande "On Sub-picture Based HRD Buffering", JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL:http://wftp3.1tu.int/av-arch/.jctvc-site/,, No. JCTVC-K0221, XP030113103, 10 pp.

Hannuksela et al., "AHG9: Operation points in UPS and nesting SEI", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/ No. JCTVC-K0180, XP030113062, 5 pp.

Hannuksela et al., "Scope of SEI messages", JVT Meeting; MPEG Meeting; Jul. 15-21, 2006; Klagenfurt, AT; (Joint Video Team of ISO/IEC JTC1/SC29/WG11 and ITU-TSG.16 ) No. JVT-T073, XP030006560, 6 pp.

International Search Report and Written Opinion—PCT/US2013/060906—ISAEPO—Jan. 7, 2014, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

U.S. Appl. 13/954,681, filed Jul. 30, 2013 by Wang.

U.S. Appl. 13/954,758, filed Oct. 8, 2013 by Wang.

Wang "AHG9: On HRD and related general issues", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/ No. JCTVC-K0126, XP030113008, 7 pp.

Wiegand, T., et al., "WD2: Working Draft 2 of High-Efficiency Video Coding", Jan. 28, 2011, No. JCTVC-D503, XP002679642, Retrieved from the Internet: URL: http://wftp3.itu.int/av-arch/jctvc-site/2011_01_D_Daegu/ [retrieved on Jul. 11, 2012].

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Wang: "BoG on high-level syntax for extension planning", JCT-3V Meeting; MPEG Meeting; Jul. 16-20, 2012; Stockholm; (The Joint Collaborative Team on 3D Coding Extension Development of ISO/IEC JTC1/SC29/WG11 and ITU-T SG.16); URL:http://phenix.int/evry.fr/jct2/, No. JCT3V-A0177, XP030130176, 17 pp.

U.S. Appl. 61/705,102, filed Sep. 24, 2012 by Wang.

ITU-T H.265, Series H: Audiovisual and Multimedia Systems, Infrastructure of audiovisual services—Coding of moving video, High efficiency video coding, The International Telecommunication Union, Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Response to Written Opinion dated Jan. 7, 2014, from International Application No. PCT/US2013/060906, filed on Apr. 17, 2014, 5 pp.

Second Written Opinion from International Application No. PCT/US2013/060906, dated Aug. 5, 2014, 7 pp.

Response to Second Written Opinion dated Aug. 5, 2014, from International Application No. PCT/US2013/060906, filed on Sep. 30, 2014, 19 pp.

International Preliminary Report on Patentability from International Application No. PCT/US2013/060906, dated Nov. 7, 2014, 9 pp.

Wang, "Spec Text Changes for JCTVC-K0126 based on JCTVC-K0030v2", JCTVC-K0126 (version 1), Joint Collaborative Team on Video Coding (JCT-VC) of ITU-T SG 16 WP 3 and ISO/IEC JTC 1/SC 29/WG 11, Oct. 1 2012, 15 pp.

\* cited by examiner

HYPOTHETICAL REFERENCE DECODER PARAMETER SYNTAX STRUCTURE

This application claims the benefit of U.S. Provisional Patent Application No. 61/711,098, filed Oct. 8, 2012, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes signaling of hypothetical reference decoder (HRD) parameters. For instance, a video encoder may signal, in a bitstream, a video parameter set (VPS) that includes a plurality of HRD parameter syntax structures that each includes a set of one or more HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of the bitstream. The common set of HRD parameters is common to all sub-layers of the bitstream. A video decoder or other device may decode, from the bitstream, the VPS and may perform an operation using the HRD parameters of at least one of the HRD parameter syntax structures.

In one example, this disclosure describes a method of decoding video data. The method comprises decoding, from an encoded video bitstream, a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters. The common set of HRD parameters is common to all sub-layers of the encoded video bitstream. The method also comprises performing an operation using the HRD parameters of at least one of the HRD parameter syntax structures.

In another example, this disclosure describes a video decoding device comprising one or more processors configured to decode, from an encoded video bitstream, a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters. The common set of HRD parameters is common to all sub-layers of the encoded video bitstream. The one or more processors are also configured to perform an operation using the HRD parameters of at least one of the HRD parameter syntax structures.

In another example, this disclosure describes a video decoding device comprising means for decoding, from an encoded video bitstream, a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters, wherein the common set of HRD parameters is common to all sub-layers of the encoded video bitstream. The video decoding device comprises means for performing an operation using the HRD parameters of at least one of the HRD parameter syntax structures.

In another example, this disclosure describes a computer-readable storage medium that stores instructions that, when executed by a video decoding device, configure the video decoding device to decode, from an encoded video bitstream, a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters. The common set of HRD parameters is common to all sub-layers of the encoded video bitstream. The instructions, when executed, further configure the video decoding device to perform an operation using the HRD parameters of at least one of the HRD parameter syntax structures.

In another example, this disclosure describes a method of encoding video data. The method comprises generating a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of an encoded video bitstream. The common set of HRD parameters is common to all sub-layers of the encoded video bitstream. The method also comprises signaling the VPS in the encoded video bitstream.

In another example, this disclosure describes a video encoding device comprising one or more processors configured to generate a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of an encoded video bitstream. The common set of HRD parameters is common to all sub-layers of the encoded video bitstream. The one or more processors are also configured to signal the VPS in the encoded video bitstream.

In another example, this disclosure describes a video encoding device comprising means for generating, a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of an encoded video bitstream. The common set of HRD parameters is common to all sub-layers of the encoded video bitstream. The video encoding device also comprises means for signaling the VPS in the encoded video bitstream.

In another example, this disclosure describes a computer-readable storage medium that stores instructions that, when executed by a video encoding device, configure the video encoding device to generate a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of the encoded video bitstream. The common set of HRD parameters is common to all sub-layers of the encoded video bitstream. The instructions, when executed, further configure the video encoding device to signal the VPS in the encoded video bitstream.

The details of one or more examples of the disclosure are set forth in the accompanying drawings and the description below. Other features, objects, and advantages will be apparent from the description, drawings, and claims.

DETAILED DESCRIPTION

Figure 1:
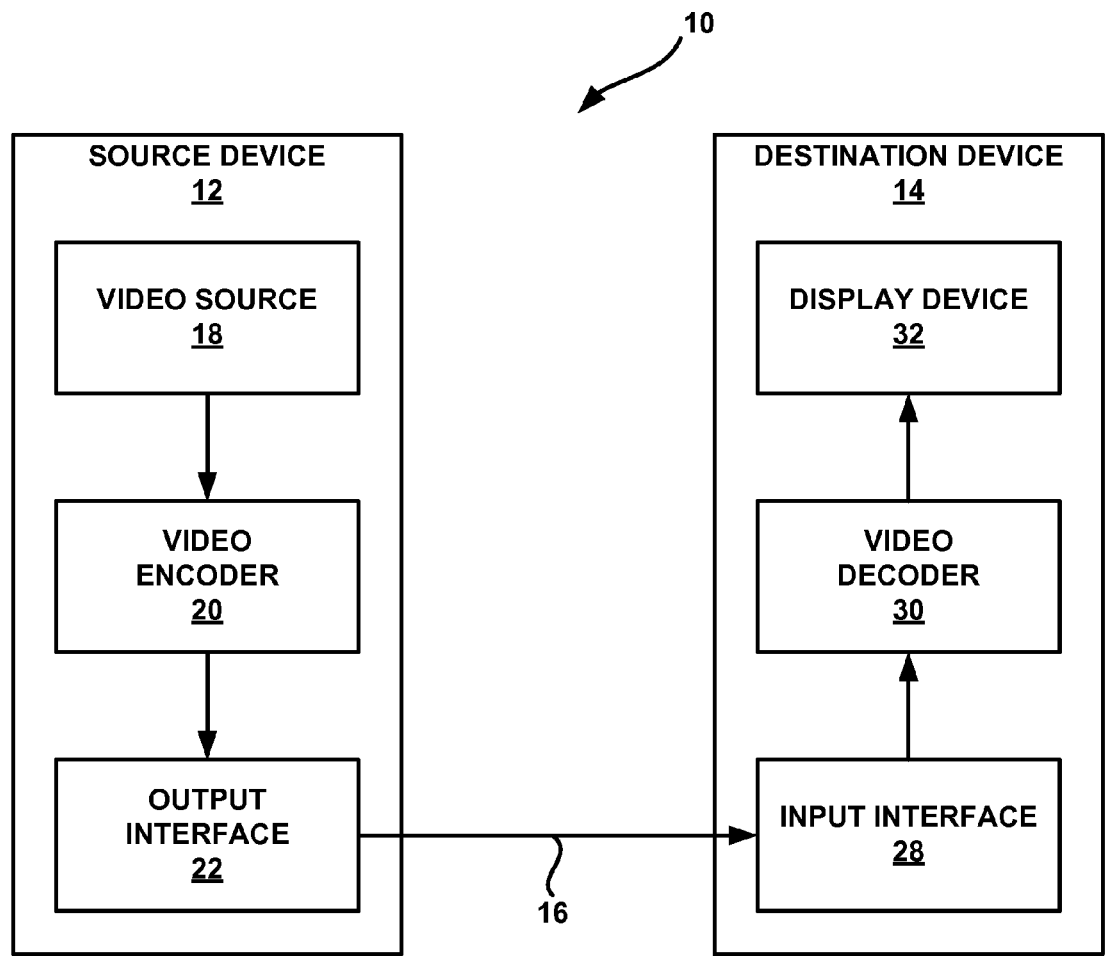
FIG. 1 is a block diagram illustrating an example video coding system that may utilize the techniques described in this disclosure.

A video encoder may generate a bitstream that includes encoded video data. Because the bitstream includes encoded video data, the bitstream may be referred to herein as an encoded video bitstream. The bitstream may comprise a series of network abstraction layer (NAL) units. The NAL units may include video coding layer (VCL) NAL units and non-VCL NAL units. The VCL NAL units may include coded slices of pictures. A non-VCL NAL unit may include a video parameter set (VPS), a sequence parameter set (SPS), a picture parameter set (PPS), supplemental enhancement information (SEI), or other types of data. A VPS is a syntax structure that may contain syntax elements that apply to zero or more entire coded video sequences. A SPS is a syntax structure that may contain syntax elements that apply to zero or more entire coded video sequences. A single VPS may be applicable to multiple SPS's. A PPS is a syntax structure that may contain syntax elements that apply to zero or more entire coded pictures. A single SPS may be applicable to multiple PPS's.

A device, such as a content delivery network (CDN) device, media-aware network element (MANE), video encoder, or video decoder, may extract a sub-bitstream from the bitstream. The device may perform the sub-bitstream extraction process by removing certain NAL units from the bitstream. The resulting sub-bitstream includes the remaining, non-removed NAL units of the bitstream. In some examples, video data decoded from the sub-bitstream may have a lower frame rate and/or may represent fewer views than the original bitstream.

Video coding standards may include various features to support the sub-bitstream extraction process. For example, video data of the bitstream may be divided into a set of layers. For each of the layers, data in a lower layer may be decoded without reference to data in any higher layer. NAL units only encapsulate data of a single layer. Thus, NAL units encapsulating data of the highest remaining layer of the bitstream may be removed from the bitstream without affecting the decodability of data in the remaining layers of the bitstream. In scalable video coding (SVC), higher layers may include enhancement data that improve the quality of pictures in lower layers (quality scalability), enlarge the spatial format of pictures in lower layers (spatial scalability), or increase the temporal rate of pictures in lower layers (temporal scalability). In multi-view coding (MVC) and three-dimensional video (3DV) coding, higher layers may include additional views.

Each NAL unit may include a header and a payload. The headers of NAL units may include nuh_reserved_zero_6 bits syntax elements. The nuh_reserved_zero_6 bits syntax element of a NAL unit is equal to 0 if the NAL unit relates to a base layer in MVC, 3DV coding, or SVC. Data in a base layer of a bitstream may be decoded without reference to data in any other layer of the bitstream. If the NAL unit does not relate to a base layer in MVC, 3DV, or SVC, the nuh_reserved_zero_6 bits syntax element may have other non-zero values. Specifically, if a NAL unit does not relate to a base layer in MVC, 3DV, or SVC, the nuh_reserved_zero_6 bits syntax element of the NAL unit specifies a layer identifier that identifies a layer associated with the NAL unit.

Furthermore, some pictures within a layer may be decoded without reference to other pictures within the same layer. Thus, NAL units encapsulating data of certain pictures of a layer may be removed from the bitstream without affecting the decodability of other pictures in the layer. For example, pictures with even picture order count (POC) values may be decodable without reference to pictures with odd POC values. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may include nuh_temporal_id_plus1 syntax elements. The nuh_temporal_id_plus1 syntax element of a NAL unit may specify a temporal identifier of the NAL unit. If the temporal identifier of a first NAL unit is less than the temporal identifier of a second NAL unit, the data encapsulated by the first NAL unit may be decoded without reference to the data encapsulated by the second NAL unit.

Operation points of a bitstream are each associated with a set of layer identifiers (i.e., a set of nuh_reserved_zero_6 bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset (i.e., a sub-bitstream) that is associated with an operation point. The operation point representation of an operation point may include each NAL unit that is associated with the operation point. The operation point representation does not include VCL NAL units that are not associated with the operation point.

An external source may specify a set of target layer identifiers for an operation point. For example, a content delivery network (CDN) device may specify the set of target layer identifiers. In this example, the CDN device may use the set of target layer identifiers to identify an operation point. The CDN device may then extract the operation point representation for the operation point and forward the operation point representation, instead of the original bitstream, to a client device. Extracting and forwarding the operation point representation to the client device may reduce the bit rate of the bitstream.

Furthermore, video coding standards specify video buffering models. A video buffering model may also be referred to as a "hypothetical reference decoder" or an "HRD." The HRD describes how data is to be buffered for decoding and how decoded data is buffered for output. For instance, the HRD describes the operation of a coded picture buffer ("CPB") and a decoded picture buffer ("DPB") in a video decoder. The CPB is a first-in first-out buffer containing access units in decoding order specified by HRD. The DPB is a buffer holding decoded pictures for reference, output reordering, or output delay specified by the HRD.

A video encoder may signal a set of HRD parameters. The HRD parameters control various aspects of the HRD. The HRD parameters may include an initial CPB removal delay, a CPB size, a bit rate, an initial DPB output delay, and a DPB size. These HRD parameters may be coded in a hrd_parameters( ) syntax structure specified in a VPS and/or a SPS. The HRD parameters may also be specified in buffering period SEI messages or picture timing SEI messages.

As explained above, an operation point representation may have a different frame rate and/or bit rate than an original bitstream. This is because the operation point representation may not include some pictures and/or some of the data of the original bitstream. Hence, if the video decoder were to remove data from the CPB and/or the DPB at a particular rate when processing the original bitstream and if the video decoder were to remove data from the CPB and/or the DPB at the same rate when processing an operation point representation, the video decoder may remove too much or too little data from the CPB and/or the DPB. Accordingly, the video encoder may signal different sets of HRD parameters for different operation points. In the emerging High-Efficiency Video Coding (HEVC) standard, the video encoder may signal sets of HRD parameters in a VPS or the video encoder may signal sets of HRD parameters in a SPS.

The set of HRD parameters optionally includes a set of information that is common for all temporal sub-layers. A temporal sub-layer is a temporal scalable layer of a temporal scalable bitstream consisting of VCL NAL units with a particular temporal identifier and the associated non-VCL NAL units. In addition to the set of common information, the sets of HRD parameters may include a set of syntax elements that are specific to individual temporal sub-layers. Because the set of common information is common to multiple sets of HRD parameters, it may be unnecessary to signal the set of common information in multiple sets of HRD parameters. In some proposals for HEVC, the common information may be present in a set of HRD parameters when the set of HRD parameters is the first set of HRD parameters in a VPS or the common information may be present in a set of HRD parameters when the set of HRD parameters is associated with the first operation point.

However, when there are multiple sets of HRD parameters in a VPS, it may be desirable to have multiple different sets of common information for the sets of HRD parameters. This may be especially true when there are large numbers of HRD parameter syntax structures in a VPS. Thus, it may be desirable to have sets of common information in HRD parameter syntax structures other than the first HRD parameter syntax structure.

The techniques of this disclosure provide a design to allow for the common information of HRD parameter syntax structures to be explicitly signaled for any HRD parameter syntax structure. In other words, the techniques of this disclosure may allow for the information that is common for all sub-layers to be explicitly signaled for any hrd_parameters( ) syntax structure. This may improve coding efficiency.

Thus, in accordance with one or more techniques of this disclosure, a device, such as a video decoder or other device, may determine, based at least in part on a syntax element in a VPS that includes a plurality of HRD parameter syntax structures, whether a particular HRD parameter syntax structure in the VPS includes a set of HRD parameters that are common to each sub-layer of a bitstream. The device may decode the syntax element from the VPS. One or more HRD parameter syntax structures may occur in coding order in the VPS before the particular HRD parameter syntax structure. In response to determining that the particular HRD parameter syntax structure includes the set of HRD parameters that are common to each sub-layer of the bitstream, the device may perform an operation using the particular HRD parameter syntax structure, including the set of HRD parameters that are common to each sub-layer of the bitstream.

Furthermore, a video encoder may generate scalable nesting SEI messages. A scalable nesting SEI message contains one or more SEI messages. SEI messages nested in a scalable nesting SEI message may include HRD parameters or other information associated with an operation point. Some proposals for HEVC do not allow for one SEI message to be applied to multiple operation points. This may decrease bit rate efficiency because it may cause a video encoder to signal multiple SEI messages with the same information. Accordingly, the techniques of this disclosure may allow for one SEI message to be applied to multiple operation points. For instance, a scalable nesting SEI message may include syntax elements that specify multiple operation points applicable to SEI messages nested within the scalable nesting SEI message.

In addition, SEI NAL units, like other types of NAL units, include a NAL unit header and a NAL unit body. The NAL unit body of an SEI NAL unit may include an SEI message, such as a scalable nesting SEI message or another type of SEI message. Like other NAL units, the NAL unit header of an SEI NAL unit may include a nuh_reserved_zero_6 bits syntax element and a nuh_temporal_id_plus1 syntax element. However, in some proposals for HEVC, the nuh_reserved_zero_6 bits syntax element and/or the nuh_temporal_id_plus1 syntax element of a NAL unit header of an SEI NAL unit are not used to determine an operation point applicable to an SEI message (or SEI messages) encapsulated by the SEI NAL unit. However, these syntax elements of the SEI NAL unit header could be reused in order to reduce the number of signaled bits. Hence, in accordance with the techniques of this disclosure, a syntax element may be signaled in a scalable nesting SEI message to indicate whether an operation point applicable to nested SEI messages in an SEI NAL unit is the operation point indicated by the layer identification information in the NAL unit header of the SEI NAL unit. The layer identification information in the NAL unit header of an SEI NAL unit may include the value of nuh_reserved_zero_6 bits and the value of nuh_temporal_id_plus1 of the NAL unit header.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to MVC-based 3DV always contain a sub-bitstream that is compliant to a MVC profile, e.g., stereo high profile. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, $10^{th}$ Meeting, Stockholm, Sweden, July 2012, which as of Jun. 13, 2013, is available from http://phenix.int-evey.fr/jct/doc_end_user/documents/10_Stockholm/wg11/JCTVC-J1003-v8.zip. Another draft of the upcoming HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, $11^{th}$ Meeting, Shanghai, China, October 2012, which as of Jun. 13, 2013, is available from http://phenix.int-evey.fr/jct/doc_end_user/documents/11_Shanghai/wg11/JCTVC-K1003-v13.zip. Furthermore, there are ongoing efforts to produce SVC, MVC, and 3DV extensions for HEVC. The 3DV extension of HEVC may be referred to as HEVC-based 3DV or HEVC-3DV.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses bi-prediction to generate the predictive blocks for a PU, the PU may have two motion vectors.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

Video coding standards specify video buffering models. In H.264/AVC and HEVC, a buffering model is referred to as a "hypothetical reference decoder" or "HRD." In HEVC Working Draft 8, the HRD is described in Annex C.

The HRD describes how data is to be buffered for decoding and how decoded data is buffered for output. For instance, the HRD describes the operation of a CPB, a decoded picture buffer ("DPB"), and a video decoding process. The CPB is a first-in first-out buffer containing access units in a decoding order specified by HRD. The DPB is a buffer holding decoded pictures for reference, output reordering, or output delay specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics.

In H.264/AVC and HEVC, bitstream conformance and decoder conformance are specified as parts of the HRD specification. In other words, the HRD model specifies tests to determine whether a bitstream conforms to a standard and tests to determine whether a decoder conforms to the standard. Though the HRD is named as some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8 bits, zero_byte, start_coded_prefix_one_3 bytes, and trailing zero_8 bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule. Furthermore, the device may invoke a decoding process that decodes the coded video data in the CPB. The decoding process may output decoded pictures to the DPB. As the device moves data through the HRD, the device may determine whether a particular set of constraints remain satisfied. For example, the device may determine whether an overflow or underflow condition occurs in the CPB or DPB while the HRD is decoding the operation point representation of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC. In this disclosure, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values. Alternatively, the constraints may take the form of constraints on arithmetic combinations of values (e.g., picture width multiplied by picture height multiplied by number of pictures decoded per second). Typically, a level specified for a lower tier is more constrained than a level specified for a higher tier.

When a device performs a decoder conformance test to determine whether a decoder under test (DUT) conforms to a video coding standard, the device may provide, to both the HRD and the DUT, a bitstream that conforms to the video coding standard. The HRD may process the bitstream in the manner described above with regard to the bitstream conformance test. The device may determine that the DUT conforms to the video coding standard if the order of decoded pictures output by the DUT matches the order of decoded pictures output by the HRD. Moreover, the device may determine that the DUT conforms to the video coding standard if the timing with which the DUT outputs decoded pictures matches the timing with which the HRD outputs the decoded pictures.

In the H.264/AVC and HEVC HRD models, decoding or CPB removal may be access unit based. That is, the HRD is assumed to decode complete access units at one time and remove complete access units from the CPB. Furthermore, in the H.264/AVC and HEVC HRD models, it is assumed that picture decoding is instantaneous. Video encoder 20 may signal, in picture timing SEI messages, decoding times to start decoding of access units. In practical applications, if a conforming video decoder strictly follows the decoding times signaled to start decoding of access units, the earliest possible time to output a particular decoded picture is equal to the decoding time of that particular picture plus the time needed for decoding that particular picture. However, in the real-world, the time needed for decoding a picture cannot be equal to zero.

HRD parameters may control various aspects of the HRD. In other words, the HRD may rely on the HRD parameters. The HRD parameters may include an initial CPB removal delay, a CPB size, a bit rate, an initial DPB output delay, and a DPB size. Video encoder 20 may signal these HRD parameters in a hrd_parameters( ) syntax structure specified in a video parameter set (VPS) and/or a sequence parameter set (SPS). Individual VPS's and/or SPS's may include multiple hrd_parameters( ) syntax structures for different sets of HRD parameters. In some examples, video encoder 20 may signal HRD parameters in buffering period SEI messages or picture timing SEI messages.

As explained above, an operation point of a bitstream is associated with a set of layer identifiers (i.e., a set of nuh_reserved_zero_6 bits values) and a temporal identifier. An operation point representation may include each NAL unit that is associated with the operation point. An operation point representation may have a different frame rate and/or bit rate than an original bitstream. This is because the operation point representation may not include some pictures and/or some of the data of the original bitstream. Hence, if video decoder 30 were to remove data from the CPB and/or the DPB at a particular rate when processing the original bitstream and if video decoder 30 were to remove data from the CPB and/or the DPB at the same rate when processing an operation point representation, video decoder 30 may remove too much or too little data from the CPB and/or the DPB. Accordingly, video encoder 20 may signal different sets of HRD parameters for different operation points. For instance, video encoder 20 may include, in a VPS, multiple hrd_parameters( ) syntax structures that include HRD parameters for different operation points.

In HEVC Working Draft 8, the set of HRD parameters optionally includes a set of information that is common for all temporal sub-layers. In other words, the set of HRD parameters may optionally include a set of common syntax elements that are applicable to operation points that include any temporal sub-layers. A temporal sub-layer may be a temporal scalable layer of a temporal scalable bitstream consisting of VCL NAL units with a particular value of TemporalId and the associated non-VCL NAL units. In addition to the set of common information, the sets of HRD parameters may include a set of syntax elements that are specific to individual temporal sub-layers. For instance, the hrd_parameters( ) syntax structure may optionally include a set of information that is common for all sub-layers and always includes sub-layer-specific information. Because the set of common information is common to multiple sets of HRD parameters, it may be unnecessary to signal the set of common information in multiple sets of HRD parameters. Rather, in HEVC Working Draft 8, the common information may be present in a set of HRD parameters when the set of HRD parameters is the first set of HRD parameters in a VPS or the common information may be present in a set of HRD parameters when the set of HRD parameters is associated with a first operation point index. For instance, HEVC Working Draft 8 supports the presence of common information when either the hrd_parameters ( ) syntax structure is the first hrd_parameters( ) syntax structure in the VPS or when the hrd_parameters( ) syntax structure is associated with a first operation point index.

Table 1, below, is an example syntax structure for a hrd_parameters( ) syntax structure in HEVC.

TABLE 1

HRD Parameters

| | |
|---|---|
| hrd_parameters( commonInfPresentFlag, MaxNumSubLayersMinus1 ) { | Descriptor |
|   if( commonInfPresentFlag ) { | |
|     timing_info_present_flag | u(1) |
|     if( timing_info_present_flag ) { | |
|       num_units_in_tick | u(32) |
|       time_scale | u(32) |
|     } | |
|     nal_hrd_parameters_present_flag | u(1) |
|     vcl_hrd_parameters_present_flag | u(1) |
|     if( nal_hrd_parameters_present_flag \|\| | |
|       vcl_hrd_parameters_present_flag ) { | |
|       sub_pic_cpb_params_present_flag | u(1) |
|       if( sub_pic_cpb_params_present_flag ) { | |
|         tick_divisor_minus2 | u(8) |
|         du_cpb_removal_delay_length_minus1 | u(5) |
|       } | |
|       bit_rate_scale | u(4) |
|       cpb_size_scale | u(4) |
|       initial_cpb_removal_delay_length_minus1 | u(5) |
|       cpb_removal_delay_length_minus1 | u(5) |
|       dpb_output_delay_length_minus1 | u(5) |
|     } | |
|   } | |
|   for( i = 0; i <= MaxNumSubLayersMinus1; i++ ) { | |
|     fixed_pic_rate_flag[ i ] | u(1) |
|     if( fixed_pic_rate_flag[ i ] ) | |
|       pic_duration_in_tc_minus1[ i ] | ue(v) |
|     low_delay_hrd_flag[ i ] | u(1) |
|     cpb_cnt_minus1[ i ] | ue(v) |
|     if( nal_hrd_parameters_present_flag ) | |
|       sub_layer_hrd_parameters( i ) | |
|     if( vcl_hrd_parameters_present_flag ) | |
|       sub_layer_hrd_parameters( i ) | |
|   } | |
| } | |

In the example of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n.

In the example syntax of Table 1, the syntax elements in the "if (commonInfPresentFlag){ . . . }" block are the common information of the HRD parameter syntax structure. In other words, the common information of the set of HRD parameters may include the syntax elements timing info_present_flag, num_units_in_tick, time_scale, nal_hrd_parameters_present_flag, vcl_hrd_parameters_present_flag, sub_pic_cpb_params_present_flag, tick_divisor_minus2, du_cpb_removal_delay_length_minus1, bit_rate_scale, cpb_size_scale, initial_cpb_removal_delay_length_minus1, cpb_removal_delay_length_minus1, and dpb_output_delay_length_minus1.

Furthermore, in the example of Table 1, the syntax elements fixed_pic_rate_flag[i], pic_duration_in_tc_minus1 [i], low_delay_hrd_flag[i], and cpb_cnt_minus1[i] may be a set of sub-layer-specific HRD parameters. In other words, these syntax elements of the hrd_parameter( ) syntax structure may only be applicable to operation points that include a specific sub-layer. Thus, the HRD parameters of a hrd_parameters( ) syntax structure may include, in addition to the optionally-included common information, a set of sub-layer-specific HRD parameters that is specific to a particular sub-layer of the bitstream.

The fixed_pic_rate_flag[i] syntax element may indicate that, when HighestTid is equal to i, the temporal distance between the HRD output times of any two consecutive pictures in output order is constrained a specific way. HighestTid may be a variable that identifies a highest temporal sub-layer (e.g., of an operation point). The pic_duration_in_tc_minus1 [i] syntax element may specify, when HighestTid is equal to i, the temporal distance, in clock ticks, between the HRD output times of any consecutive pictures in output order in the coded video sequence. The low_delay_hrd_flag[i] syntax element may specify the HRD operation mode, when Highest-Tid is equal to i, as specified in Annex C of HEVC Working Draft 8. The cpb_cnt_minus1[i] syntax element may specify the number of alternative CPB specifications in the bitstream of the coded video sequence when HighestTid is equal to i, wherein one alternative CPB specification refers to one particular CPB operation with a particular set of CPB parameters.

Video encoder 20 may use SEI messages to include, in the bitstream, metadata that is not required for correct decoding of the sample values of pictures. However, video decoder 30 or other devices may use the metadata included in SEI messages for various other purposes. For example, video decoder 30 or another device may use the metadata in SEI messages for picture output timing, picture displaying, loss detection, and error concealment.

Video encoder 20 may include one or more SEI NAL units in an access unit. In other words, any number of SEI NAL units may be associated with an access unit. Furthermore, each SEI NAL unit may contain one or more SEI messages. The HEVC standard describes the syntax and semantics for various types of SEI messages. However, the HEVC standard does not describe the handling of the SEI messages because the SEI messages do not affect the normative decoding process. One reason to have SEI messages in the HEVC standard is to enable supplemental data being interpreted identically in different systems using HEVC. Specifications and systems using HEVC may require video encoders to generate certain SEI messages or may define specific handling of particular types of received SEI messages. Table 2, below, lists SEI messages specified in HEVC and briefly describes their purposes.

TABLE 2

Overview of SEI messages

| SEI message | Purpose |
| --- | --- |
| Buffering period | Initial delays for hypothetical reference decoder (HRD) operation |
| Picture timing | Picture output time and picture/sub-picture removal time for HRD operation |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Field indication | Provides information related to interlaced video content and/or field coding, e.g. indicates whether the picture is a progressive frame, a field, or a frame containing two interleaved fields |
| Decoded picture hash | Checksum of the decoded picture, which may be used for error detection |
| Sub-picture timing | Sub-picture removal time for HRD operation |
| Active parameter sets | Provides information on active VPS, SPS, etc. |
| Structure of Pictures description | Describes the temporal and inter prediction structure of the bitstream |

U.S. Provisional Patent Application 61/705,102, filed Sep. 24, 2012, describes various methods for signaling and selection of HRD parameters, including signaling and selection of delay and timing information in SEI messages. Hannuksela et al., "AHG9: Operation points in VPS and nesting SEI," Joint Collaborative Team on Video Coding (JCT-VC) of ITU-T SG 16 WP 3 and ISO/IEC JTC 1/SC 29/WG11, 11$^{th}$ Meeting, Shanghai, Conn., 10-19 Oct. 2012, document no. JCTVC-K0180v1, which, as of Jun. 13, 2013, is available at http://phenix.int-evry.fr/jct/doc_end_user/documents/11_Shanghai/wg11/JCTVC-K0180-v1.zip, provides another method for signaling of HRD parameters as well as a mechanism for nesting of SEI messages.

There are several problems or shortcomings with existing techniques for signaling HRD parameters. For example, the existing techniques may not allow a set of HRD parameters to be shared by multiple operation points. However, when the number of operation points is high, it may be a burden on video encoder 20 or another unit that attempts to ensure the conformance of a bitstream to produce different sets of HRD parameters for each operation point. Rather, the bitstream conformance may be ensured by making sure that each operation point is associated with a set of HRD parameters but that a particular set of HRD parameters may be shared by multiple operation points. One or more techniques of this disclosure may provide a design to allow for one set of HRD parameters to be shared by multiple operation points. In other words, a single set of HRD parameters may be applicable to multiple operation points. This design may allow video encoder 20 or another unit that attempts to ensure the conformance of a bitstream to trade-off between complexity and performance.

In another example of the problems or shortcomings with existing techniques of signaling HRD parameters, when there are multiple sets of HRD parameters in a VPS, it may be desirable to have multiple different sets of common information for the sets of HRD parameters. This may be especially true when there are large numbers of HRD parameter syntax structures in a VPS. Thus, it may be desirable to have sets of common information in HRD parameter syntax structures other than the first HRD parameter syntax structure. For instance, to provide increased performance when there are multiple hrd_parameters( ) syntax structures in a VPS, particularly when the total number of hrd_parameters( ) syntax structures is relatively high, it may be desirable to have different common information for hrd_parameters( ) syntax structures other than the common information of the first hrd_parameters( ) syntax structure or other than the common information of the first operation point index.

One or more techniques of this disclosure provide a design to allow for the common information of sets of HRD parameters to be explicitly signaled for any set of HRD parameters. For instance, the techniques of this disclosure may allow for the information that is common for all sub-layers to be explicitly signaled for any hrd_parameters( ) syntax structure.

In this way, video encoder 20 may signal, in a bitstream, a VPS that includes a plurality of HRD parameter syntax structures that each include HRD parameters. For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of the bitstream. The common set of HRD parameters is common to all sub-layers of the bitstream.

Similarly, video decoder 30 or another device may decode, from a bitstream, a VPS that includes a plurality of HRD parameter syntax structures that each include HRD parameters. For each respective HRD parameter syntax structure in the plurality of HRD parameter syntax structures, the VPS may further include a syntax element indicating whether the HRD parameters of the respective HRD parameter syntax structure include a common set of HRD parameters. Video decoder 30 or other device may perform an operation using the HRD parameters of at least one of the HRD parameter syntax structures.

Furthermore, existing methods for nesting of SEI messages may have several problems or shortcomings. For example, the existing techniques of signaling HRD parameters may not allow for one SEI message to be applied to multiple operation points. The techniques of this disclosure may provide a design to allow for one SEI message to be applied to multiple operation points.

In particular, a scalable nesting SEI message may include syntax elements that specify multiple operation points applicable to SEI messages nested within the scalable nesting SEI message. In other words, scalable nesting SEI messages may provide a mechanism for associating SEI messages with a bitstream subset (e.g., an operation point representation) or with specific layers and sub-layers.

In this way, video encoder 20 may generate a scalable nesting SEI message that includes a plurality of syntax elements that identify a plurality of operation points to which a nested SEI message encapsulated by the scalable nesting SEI message applies. Furthermore, video encoder 20 may signal the scalable nesting SEI message in a bitstream.

In this way, video decoder 30 or another device may, in a video coding process, decode, from a scalable nesting SEI message, a plurality of syntax elements that identify operation points to which a nested SEI message encapsulated by the scalable nesting SEI message applies. Furthermore, video decoder 30 or other device may perform an operation based at least in part on one or more of syntax elements of the nested SEI message.

Another example of the problems or shortcomings with existing techniques of nesting SEI messages concerns the fact that the existing techniques of nesting SEI messages do not use the value of a layer identifier syntax element (e.g., nuh_reserved_zero_6 bits) in a current SEI NAL unit to determine an operation point applicable to scalable nested SEI messages encapsulated by the current SEI NAL unit.

The techniques of this disclosure provide a design that signals whether an operation point applicable to nested SEI messages in an SEI NAL unit is the operation point indicated by the layer identification information in the NAL unit header of the SEI NAL unit. The layer identification information in the NAL unit header of an SEI NAL unit may include the value of nuh_reserved_zero_6 bits and the value of nuh_temporal_id_plus1 of the NAL unit header. In other words, the techniques of this disclosure may provide a design for the use of layer identification information (e.g., the value of nuh_reserved_zero_6 bits and nuh_temporal_id_plus1) in the NAL unit header of a current SEI NAL unit (i.e., the SEI NAL unit containing the scalable nesting SEI message), through the signaling of whether the nested SEI messages apply to a default operation point identified by the layer identification information included in the NAL unit header of the current SEI NAL unit.

In this way, video encoder 20 may include, in a scalable nesting SEI message encapsulated by an SEI NAL unit, a syntax element that indicates whether a nested SEI message encapsulated by the scalable nesting SEI message is applicable to a default sub-bitstream. The default sub-bitstream may be an operation point representation of an operation point defined by a layer identifier specified in a NAL unit header of the SEI NAL unit and a temporal identifier specified in the NAL unit header. Furthermore, video encoder 20 may output a bitstream that includes the scalable nesting SEI message.

Similarly, a device, such as video decoder 30 or another device, may determine, based at least in part on a syntax element in a scalable nesting SEI message encapsulated by an SEI NAL unit, whether a nested SEI message encapsulated by the scalable nesting SEI message is applicable to a default sub-bitstream. As before, the default sub-bitstream may be an operation point representation of an operation point defined by a layer identifier specified in a NAL unit header of the SEI NAL unit and a temporal identifier specified in the NAL unit header. When the nested SEI message is applicable to the default sub-bitstream, the device may use the nested SEI message in an operation on the default sub-bitstream. For example, the nested SEI message may include one or more HRD parameters. In this example, the device may use the one or more HRD parameters to perform a bitstream conformance test that determines whether the default sub-bitstream conforms to a video coding standard, such as HEVC. Alternatively, in this example, the device may use the one or more HRD parameters to determine whether video decoder 30 satisfies a decoder conformance test.

In another example of the problems or shortcoming of the existing methods for nesting of SEI messages, the explicit coding of layer identifiers is inefficient. The techniques of this disclosure may increase the efficiency of explicit coding of layer identifiers through differential coding or coding using flags.

Figure 2:
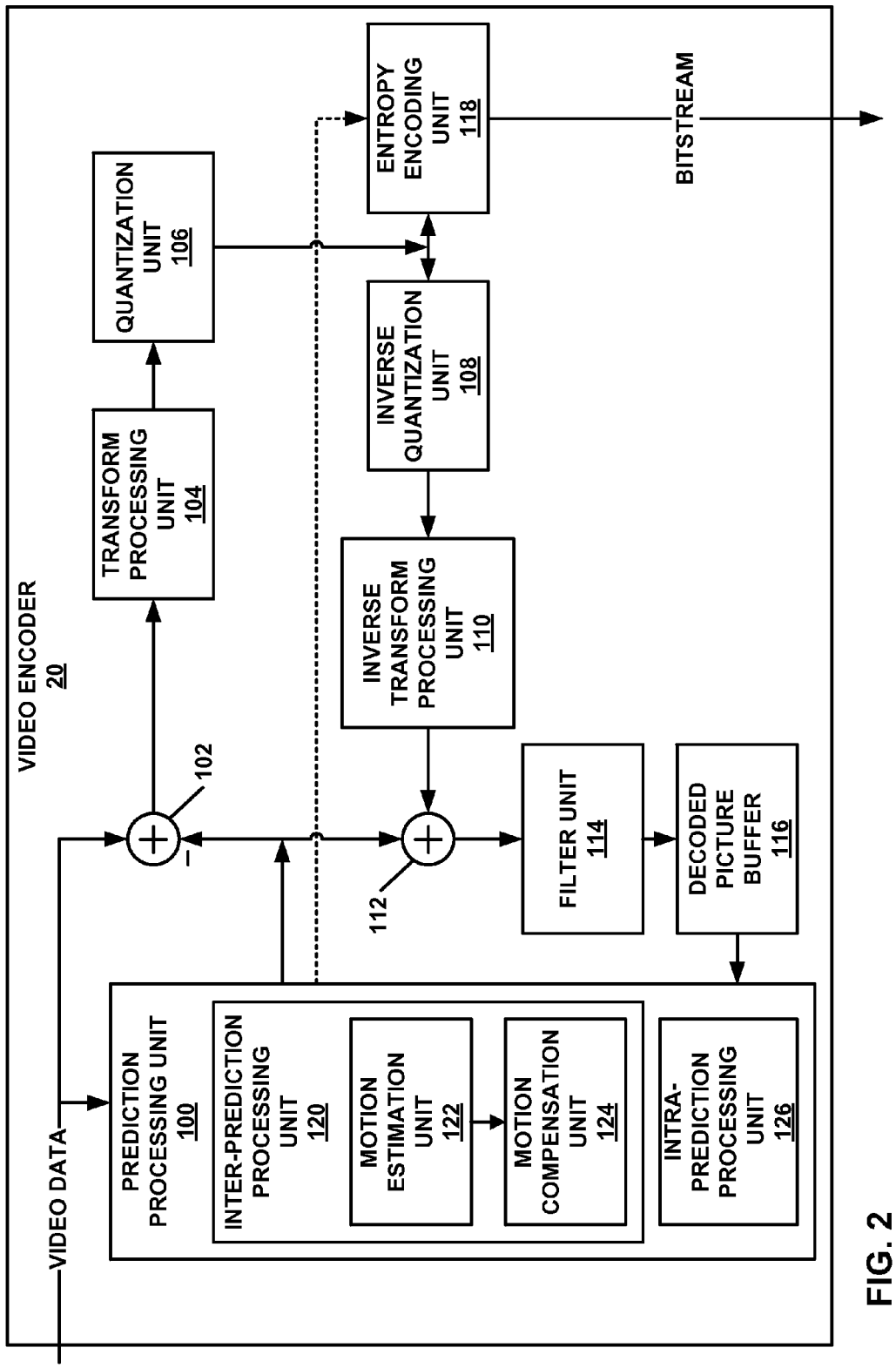
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predictive block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely correspond to the sample blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may generate a predictive block for a PU based on samples of neighboring PUs. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

As indicated above, the techniques of this disclosure may provide a design to allow for the common information of HRD parameter syntax structures to be explicitly signaled for any HRD parameter syntax structure in a VPS. To enable the common information of HRD parameter syntax structures to be explicitly signaled for any HRD parameter in a VPS, video encoder 20 may generate VPS syntax structures that conform to the example syntax shown in Table 3, below.

TABLE 3

VPS Syntax Structure

| video_parameter_set_rbsp( ) { | Descriptor |
|---|---|
|    video_parameter_set_id | u(4) |
|    vps_temporal_id_nesting_flag | u(1) |
|    reserved_zero_2bits | u(2) |
|    reserved_zero_6bits | u(6) |
|    vps_max_sub_layers_minus1 | u(3) |
|    profile_tier_level( 1, vps_max_sub_layers_minus1 ) | |
|    next_essential_info_byte_offset | u(12) |
|    //reserved_zero_12bits in the base spec | |
|    for( i = 0; i <= vps_max_sub_layers_minus1; 1++ ) { | |
|       vps_max_dec_pic_buffering[ i ] | ue(v) |
|       vps_max_num_reorder_pics[ i ] | ue(v) |
|       vps_max_latency_increase [ i ] | ue(v) |
|    } | |
|    num_ops_minus1 | ue(v) |
|    for( i = 1; i <= num_ops_minus1; i++ ) | |
|       operation_point( i ) | |
|    vps_num_hrd_parameters | ue(v) |
|    for( i = 0; i < vps_num_hrd_parameters; i++ ) { | |
|       hrd_applicable_ops_minus1[ i ] | ue(v) |
|       for( j = 0; j <= hrd_applicable_ops_minus1[ i ]; j++ ) { | |
|          hrd_op_idx[ i ] [ j ] | ue(v) |
|       if( i > 0 ) | |
|          cprms_present_flag[ i ] | |
|       hrd_parameters( cprms_present_flag[ i ], vps_max_sub_layers_minus1 ) | |
|    } | |
|    vps_extension_flag | u(1) |
|    if( vps_extension_flag ) | |
|       while( more_rbsp_data( ) ) | |
|          vps_extension_data_flag | u(1) |
|    rbsp_trailing_bits( ) | |
| } | |

Italicized portions of Table 3 indicate differences between the syntax of Table 3 and the corresponding table from HEVC Working Draft 8. Furthermore, in the example syntax of Table 3, the num_ops_minus1 syntax element specifies the number of operation_point( ) syntax structures present in the VPS. The hrd_applicable_ops_minus1[i] syntax element specifies the number of operation points to which the i-th hrd_parameters( ) syntax structure applies. The hrd_op_idx[i][j] syntax element specifies the j-th operation point to which the i-th hrd_parameters( ) syntax structure in the VPS applies. As mentioned briefly above, the techniques of this disclosure may allow for one set of HRD parameters to be shared by multiple operation points. The hrd_applicable_ops_minus1 [i] syntax elements and the hrd_op_idx[i][j] may serve to indicate operation points to which a set of HRD parameters applies. In some examples where multiple operation points are not allowed to be applicable to a single set of HRD parameters, the hrd_applicable_ops_minus1[i] syntax elements and the hrd_op_idx[i][j] syntax elements are omitted from the Table 3.

In the example syntax of Table 3, a VPS may include a set of common parameters present flags (i.e., syntax elements), denoted in Table 3 as cprms_present_flag[i]. A cprms_present_flag[i] syntax element equal to 1 specifies that the HRD parameters that are common for all sub-layers are present in the i-th hrd_parameters( ) syntax structure in the VPS. A cprms_present_flag[i] syntax element equal to 0 specifies that the HRD parameters that are common for all sub-layers are not present in the i-th hrd_parameters( ) syntax structure in the VPS and are instead derived to be the same as the (i−1)-th hrd_parameters( ) syntax structure in the VPS. cprms_present_flag[0] may be inferred to be equal to 1. That is, a device may automatically determine (i.e., infer) that the first (in coding order) hrd_parameters( ) syntax structure in the VPS includes HRD parameters that are common for all sub-layers. Consequently, the first HRD parameter syntax structure signaled in the VPS includes a common set of HRD parameters. One or more subsequent HRD parameter syntax structures in the VPS may include different common sets of HRD parameters.

As mentioned briefly above, the techniques of this disclosure may allow for the common information (i.e., HRD parameters common to each of the sub-layers) of HRD parameter syntax structures to be explicitly signaled for any HRD parameter syntax structure. The cprms_present_flag[i] syntax element of Table 3 may enable video decoder 30 or another device to determine which of the HRD parameter syntax structures include a set of HRD parameters common to each of the sub-layers. Thus, while the first HRD parameter syntax structure may always include the common set of HRD parameters, one or more HRD parameter syntax structures signaled in the VPS do not include the common set of HRD parameters. A device may use the cprms_present_flag[i] syntax elements to determine which of the HRD parameter syntax structures of the VPS include common sets of HRD parameters.

An HRD parameter syntax structure (e.g., a hrd_parameters( ) syntax structure) may include the set of sub-layer-specific HRD parameters regardless of whether the HRD parameter syntax structure includes HRD parameters that are common for all sub-layers. When video decoder 30 or another device determines that a particular HRD parameter syntax structure does not include the common set of HRD parameters, video decoder 30 or the other device may perform an operation using a common set of HRD parameters associated with a previous HRD parameter syntax structure and the set of the sub-layer-specific HRD parameters of the particular HRD parameter syntax structure. The previous HRD parameter syntax structure may be a set of HRD parameters signaled in the VPS before, in coding order, the particular HRD parameter syntax structure. If the previous HRD parameter syntax structure includes a common set of HRD parameters, the common set of HRD parameters associated with the previous HRD parameter syntax structure is the common set of HRD parameters included in the previous HRD parameter syntax structure. If the previous HRD parameter syntax structure does not include the common set of HRD parameters, a device may determine that the common set of HRD parameters associated with the previous HRD parameter syntax structure is the common set of HRD parameters associated with a HRD parameter syntax structure prior, in coding order, to the previous HRD parameter syntax structure in coding order.

As mentioned above, a device may perform an operation using a common set of HRD parameters and sub-layer-specific HRD parameters. During this operation, the device may manage the operation of a CPB according to one or more of the HRD parameters, decode the video data, and manage decoded pictures in DPB according to one or more of the HRD parameters. In another example, the common set of HRD parameters and sub-layer-specific HRD parameters may be used to perform a bitstream conformance test or a decoder conformance test.

Furthermore, in some examples, a scalable nesting SEI message provides a mechanism for associating SEI messages with bitstream subsets (e.g., operation point representations) or with specific layers and sub-layers. In some such examples, a scalable nesting SEI message may contain one or more SEI messages. An SEI message contained in a scalable nesting SEI message may be referred to as a nested SEI message. An SEI message not contained in a scalable nesting SEI message may be referred to as a non-nested SEI message. In some examples, a nested SEI message in a scalable nesting SEI message may include a set of HRD parameters.

In some examples, there are several limitations on which types of messages may be nested. For example, a buffering period SEI message and an SEI message of any other type may not be nested in the same scalable nesting SEI message. A buffering period SEI message may indicate initial delays for HRD operation. In another example, a picture timing SEI message and an SEI message of any other type may not be nested in the same scalable nesting SEI message. A picture timing SEI message may indicate a picture output time and a picture/sub-picture removal time for HRD operation. In other examples, a picture timing SEI message and a sub-picture timing SEI message may be nested in the same scalable nesting SEI message. A sub-picture timing SEI message may provide CPB removal delay information for the decoded unit associated with the SEI message.

As indicated above, one or more techniques of this disclosure may allow for one SEI message to be applied to multiple operation points. Furthermore, one or more techniques of this disclosure may enable video encoder 20 to signal whether an operation point applicable to a nested SEI message in an SEI NAL unit is the operation point indicated by the layer identification information in the NAL unit header of the SEI NAL unit. In addition, one or more techniques of this disclosure may increase the efficiency of explicit coding of layer identifiers through differential coding. The example syntax shown in Table 4, below, and the accompanying semantics may implement these techniques.

TABLE 4

Scalable Nesting SEI Message

| scalable_nesting( payloadSize ) { | Descriptor |
|---|---|
|   bitstream_subset_flag | u(1) |
|   if( bitstream_subset_flag ) { | |
|     default_op_applicable_flag | u(1) |
|     nesting_num_ops_minus1 | ue(v) |
|   } else | |
|     nesting_op_flag | u(1) |
|   for( i = 0; i <= nesting_num_ops_minus1; i++ ) | |
|     nesting_max_temporal_id_plus1[ i ] | u(3) |
|   if( nesting_op_flag ) | |
|     for( i = 0; i <= nesting_num_ops_minus1; i++ ) | |
|       nesting_op_idx[ i ] | ue(v) |
|   else { | |
|     all_layers_flag | u(1) |
|     if( !all_layers_flag ) { | |
|       nesting_num_layers_minus1 | ue(v) |
|       for( i = 0; i <= nesting_num_layers_minus1; i++ ) | |
|         nesting_layer_id_delta[ i ] | ue(v) |
|     } | |
|   } | |
|   while( !byte_aligned( ) ) | |
|     nesting_zero_bit /* equal to 0 */ | u(1) |
|   Do | |
|     sei_message( ) | |
|   while( more_rbsp_data( ) ) | |
| } | |

In the example of Table 4, italicized portions may indicate differences from HEVC Working Draft 8. Specifically, in the example syntax of Table 4, a bitstream_subset_flag syntax element equal to 0 specifies that SEI messages nested in the scalable nesting SEI message apply to specific layers and sub-layers. A bitstream_subset_flag syntax element equal to 1 specifies that the SEI messages nested in the scalable nesting SEI message apply to a sub-bitstream resulting from a sub-bitstream extraction process of subclause 10.1 of HEVC Working Draft 8 with inputs specified by the syntax elements of the scalable nesting SEI message as specified below. Subclause 10.1 of HEVC Working Draft 8 describes an operation for extracting a sub-bitstream (i.e., an operation point representation) from the bitstream. Specifically, subclause 10.1 of HEVC Working Draft 8 provides that the sub-bitstream is derived by removing from the bitstream all NAL units with temporal identifiers (e.g., TemporalID) greater than tIdTarget or layer identifiers (e.g., nuh_reserved_zero_6 bits) not among the values in targetDecLayerIdSet. tIdTarget and targetDecLayerIdSet are parameters of the bitstream extraction process. In some examples, if the nested SEI messages are picture buffering SEI messages, picture timing SEI messages or sub-picture timing SEI messages, the bitstream_subset_flag syntax element is equal to 1. Otherwise, in such examples, the bitstream_subset_flag syntax element is equal to 0.

Furthermore, in the example syntax of Table 4, the scalable nesting SEI message includes a default_op_applicable_flag syntax element if the bitstream_subset_flag syntax element is equal to 1. A default_op_applicable_flag syntax element equal to 1 specifies that the nested SEI messages (i.e., the SEI messages nested within the scalable nesting SEI message) apply to a default sub-bitstream that is the output of the sub-bitstream extraction process of subclause 10.1 of HEVC Working Draft 8 with inputs tIdTarget equal to the temporal identifier (TemporalId) of the current SEI NAL unit and targetDecLayerIdSet consisting of all values of nuh_reserved_zero_6 bits in the range of 0 to nuh_reserved_zero_6 bits of the current SEI NAL unit, inclusive. Thus, the default sub-bitstream may be the bitstream that is derived by removing from the bitstream all NAL units with temporal identifiers greater than the temporal identifier of the current SEI NAL unit or layer identifiers in the range of 0 to the layer identifier (e.g., nuh_reserved_zero_6 bits) of the current SEI NAL unit, inclusive. For instance, the default sub-bitstream may be a subset of a bitstream and the default sub-bitstream may not include VCL NAL units of the bitstream that have layer identifiers greater than the layer identifier indicated by the layer identifier syntax element of the NAL unit header or have temporal identifiers greater than the temporal identifier indicated by the temporal layer identifier syntax element (e.g., nuh_temporal_id_plus1) of the NAL unit header. A default_op_applicable_flag syntax element equal to 0 specifies that the nested SEI messages do not apply to the default sub-bitstream.

In the example syntax of Table 4, the scalable nesting SEI message includes a nesting_num_ops_minus1 syntax element if the bitstream_subset_flag syntax element is equal to 1. The nesting_num_ops_minus1 syntax element, plus 1, specifies the number of nesting_op_idx[i] syntax elements in the scalable nesting SEI message. Thus, if the nesting_num_ops_minus1 syntax element, plus 1, is greater than 0, the nesting_num_ops_minus1 syntax element may indicate whether the scalable nesting SEI message includes a plurality of syntax elements that identify multiple operation points to which the nested SEI messages are applicable. In this way, a device may decode, from the scalable nesting SEI message, a syntax element (nesting_num_ops_minus1) that indicates the number of operation points to which the nested SEI message applies. When the nesting_num_ops_minus1 syntax element is not present, the value of nesting_num_ops_minus1 may be inferred to be equal to 0. Thus, if the bitstream_subset_flag syntax element is equal to 0, the scalable nesting SEI message includes no nesting_op_idx[i] syntax elements.

A nesting_op_flag syntax element equal to 0 specifies that nestingLayerIdSet[0] is specified by the all_layers_flag syntax element and, when present, a nesting_layer_id_delta[i] syntax element for all values i in the range of 0 to nesting_num_layers_minus1, inclusive. The nestingLayerIdSet[ ] syntax elements are an array of layer identifiers. A nesting_op_flag syntax element equal to 1 specifies that nestingLayerIdSet[i] is specified by the nesting_op_idx[i] syntax element. When not present, the value of nesting_op_flag is inferred to be equal to 1.

The nesting_max_temporal_id_plus1[i] syntax element specifies a variable maxTemporalId[i]. In the example syntax of Table 4, the value of the nesting_max_temporal_id_plus1[i] syntax element is greater than the value of the nuh_temporal_id_plus1 syntax element of the current SEI NAL unit (i.e., the NAL unit that contains the scalable nested SEI message). The variable maxTemporalId[i] is set equal to nesting_max_temporal_id_plus1[i]−1.

The nesting_op_idx[i] syntax element is used to specify the set nestingLayerIdSet[i]. The set nestingLayerIdSet[i] may consist of op_layer_id[nesting_op_idx] [i] with all values of i in the range of 0 to op_num_layer_id values_minus1[nesting_op_idx], inclusive. The active VPS may specify the op_layer_id[ ][ ] and op_num_layer_values_minus1[ ] values.

Furthermore, in the example syntax of Table 4, an all_layers_flag syntax element equal to 0 specifies that the set nestingLayerIdSet[0] consists of nestingLayerId[i] for all values i in the range of 0 to nesting_num_layers_minus1, inclusive. The variable nestingLayerId[i] is described below. An all_layers_flag syntax element equal to 1 specifies that the set nestingLayerIdSet consists of all values of nuh_reserved_zero_6 bits present in the current access unit that are equal to or greater than nuh_reserved_zero_6 bits of the current SEI NAL unit.

The nesting_num_layers_minus1 syntax element, plus 1, specifies the number of nesting_layer_id_delta[i] syntax elements in the scalable nesting SEI message. A nesting_layer_id_delta[i] syntax element, when i is equal to 0, specifies the difference between the first (i.e. the 0-th) nuh_reserved_zero_6 bits value included in the set nestingLayerIdSet[0] and the nuh_reserved_zero_6 bits syntax element of the current SEI NAL unit. A nesting_layer_id_delta[i] syntax element, when i is greater than 0, specifies the difference between the i-th and the (i−1)-th nuh_reserved_zero_6 bits values included in the set nestingLayerIdSet[0].

The variable nestingLayerId[i] may be derived as follows, where nuh_reserved_zero_6 bits is from the NAL unit header of the current SEI NAL unit.

```
nestingLayerId[ 0 ] = nuh_reserved_zero_6bits +
nesting_layer_id_delta[ 0 ]
for( i = 1; i <= nesting_num_layers_minus1; i++)
    nestingLayerId[ i ] = nestingLayerId[ i −
    1 ] + nesting_layer_id_delta[ i ]
```

The set nestingLayerIdSet[0] is set to consist of nestingLayerId[i] for all i values in the range of 0 to nesting_num_layers_minus1, inclusive. When the bitstream_subset_flag syntax element is equal to 0, the nested SEI messages apply to NAL units with nuh_reserved_zero_6 bits included in the set nestingLayerIdSet[0] or equal to nuh_reserved_zero_6 bits of the current SEI NAL unit, and with nuh_temporal_id_plus1 in the range of nuh_temporal_id_plus1 of the current SEI NAL unit to maxTemporalId[0]+1, inclusive. When the bitstream_subset_flag syntax element is equal to 1, the nested SEI messages apply to the output of the sub-bitstream extraction process of subclause 10.1 of HEVC Working Draft 8 with inputs tIdTarget equal to maxTemporalId[i] and targetDecLayerIdSet equal to nestingLayerIdSet[i] for each i value in the range of 0 to nesting_num_ops_minus1, inclusive, and when the default_op_applicable_flag syntax element is equal to 1, the nested SEI messages also apply to the default sub-bitstream. The extracted sub-bitstream may result from removing all NAL units with temporal identifiers greater than maxTemporalId[i] or layer identifiers in the range of 0 to nesting_num_ops_minus1.

In this way, for at least one respective operation point in the plurality of operation points to which the nested SEI message applies, a device (e.g., video encoder 20, video decoder 30, or another device, such as a content delivery network device) may decode, from the scalable nesting SEI message, a first syntax element (e.g., nesting_max_temporal_id_plus1[i]) and a second syntax element (e.g., nesting_op_idx[i]). Furthermore, the device may determine, based at least in part on the first syntax element, a maximum temporal identifier of the respective operation point. The device may determine, based at least in part on the second syntax element, a set of layer identifiers of the respective operation point.

In the example of Table 4, the nesting_zero_bit syntax element is equal to 0. The nesting_zero_bit syntax element may serve to ensure that the scalable nesting SEI message is byte aligned. The scalable nesting SEI message may be byte aligned when the number of bits in the scalable nesting SEI message is divisible by 8.

Furthermore, in the example of Table 4, sei_message( ) syntax structures include SEI messages. Thus, a device may decode, from the scalable nesting SEI message, a plurality of nested SEI messages encapsulated by the scalable nesting SEI message. Each of the nested SEI messages may be applicable to all of the operation points identified by the plurality of syntax elements (e.g., nesting_max_temporal_id_plus1[i], nesting_op_idx[i], etc.).

In an alternative example, scalable nesting SEI messages may conform to the example syntax of Table 5, below. In the example syntax of Table 5, a scalable nesting SEI message may, in accordance with the one or more techniques of this disclosure, increase the efficiency of explicit coding of layer identifiers through the use of coding flags.

TABLE 5

| Scalable Nesting SEI Message | |
|---|---|
| scalable_nesting( payloadSize ) { | Descriptor |
| ... | |
|   if(bitstream_subset_flag ) { | |
|     (default_op_applicable_flag | u(1) |
|     nesting_num_ops_minus1 | ue(v) |
|   } else | |
|     nesting_op_flag | u(1) |
|   for( i = 0; i <= nesting_num_ops_minus1; i++ ) | |
|     nesting_max_temporal_id_plus1[ i ] | u(3) |
|   if( nesting_op_flag ) | |
|     for( i = 0; i <= nesting_num_ops_minus1; i++ ) | |
|       nesting_op_idx[ i ] | ue(v) |
|   else { | |
|     all_layers_flag | u(1) |
|     if( !all_layers_flag ) { | |
|       nesting_max_layer_id | u(6) |
|       minLayerId = nuh_reserved_zero_6bits + 1 | |
|       for( i = 0; i < nesting_max_layer_id − | |
|       minLayerId; i++ ) | |
|         nesting_layer_id_included_flag[ i ] | ue(v) |
|     } | |
|   } | |
|   while( !byte_aligned( ) ) | |
|     nesting_zero_bit /* equal to 0 */ | u(1) |

TABLE 5-continued

Scalable Nesting SEI Message

| scalable_nesting( payloadSize ) { | Descriptor |
|---|---|
| Do
    sei_message( )
  while( more_rbsp_data( ) )
} | |

In the example of Table 5, the italicized portions show differences from HEVC Working Draft 8. As shown in Table 5, the bitstream_subset_flag syntax element, the default_op_applicable_flag syntax element, the nesting_num_ops_minus1 syntax element, the nesting_max_temporal_id_plus1 syntax element, the nesting_op_idx[i] syntax element, and the nesting_zero_bit syntax element may have the same semantics as described above with regard to Table 4.

Furthermore, in the example of Table 5, a variable minLayerId is set equal to nuh_reserved_zero_6 bits+1, where nuh_reserved_zero_6 bits is from the NAL unit header of the current SEI NAL unit. A nesting_op_flag syntax element equal to 0 specifies that the set nestingLayerIdSet[0] is specified by the all_layers_flag syntax element and, when present, nesting_layer_id_included_flag[i] for all values i in the range of 0 to nesting_max_layer_id−minLayerId−1, inclusive. A nesting_op_flag syntax element equal to 1 specifies that the set nestingLayerIdSet[i] is specified by the nesting_op_idx[i] syntax element. When the nesting_op_flag syntax element is not present, the value of nesting_op_flag is inferred to be equal to 1.

In the example of Table 5, an all_layers_flag syntax element equal to 0 specifies that the set nestingLayerIdSet[0] consists of nestingLayerId[i] for all i values in the range of 0 to nesting_max_layer_id−minLayerId, inclusive. The nestingLayerId[i] variable is described below. In the example of Table 5, an all_layers_flag equal to 1 specifies that the set nestingLayerIdSet consists of all values of nuh_reserved_zero_6 bits present in the current access unit that are greater than or equal to the nuh_reserved_zero_6 bits syntax element of the current SEI NAL unit.

Furthermore, in the example of Table 5, the nesting_max_layer_id syntax element specifies the greatest value of nuh_reserved_zero_6 bits in the set nestingLayerIdSet[0]. A nesting_layer_id_included_flag[i] syntax element equal to 1 specifies that the value of nuh_reserved_zero_6 bits equal to i+minLayerId is included in the set nestingLayerIdSet[0]. A nesting_layer_id_included_flag[i] syntax element equal to 0 specifies that the value of nuh_reserved_zero_6 bits equal to i+minLayerId is not included in the set nestingLayerIdSet[0].

The variable nestingNumLayersMinus1 and the variables nestingLayerId[i] for i in the range of 0 to nestingNumLayersMinus1, inclusive, may be derived as follows:

```
for( i = 0, j = 0; i < nesting_max_layer_id; i++ )
    if( nesting_layer_id_incuded_flag[ i ] )
        nestingLayerII[ j++ ] = i + minLayerId
nestingLayerId[ j ] = nesting_max_layer_id
nestingNumLayersMinus1 = j
```

The set nestingLayerIdSet[0] may be set to consist of nestingLayerId[i] for all i values in the range of 0 to nestingNumLayersMinus1, inclusive.

When the bitstream_subset_flag syntax element is equal to 0, the nested SEI messages may apply to NAL units with nuh_reserved_zero_6 bits included in the set nestingLayerIdSet[0] or equal to the nuh_reserved_zero_6 bits syntax element of the current SEI NAL unit, and with nuh_temporal_id_plus1 in the range from the nuh_temporal_id_plus1 syntax element of the current SEI NAL unit to maxTemporalId[0]+1, inclusive.

When the bitstream_subset_flag syntax element of the scalable nested SEI message is equal to 1, the nested SEI messages may apply to the output of the sub-bitstream extraction process of subclause 10.1 with inputs tIdTarget equal to maxTemporalId[i] and targetDecLayerIdSet equal to nestingLayerIdSet[i] for each i value in the range of 0 to nesting_num_ops_minus1, inclusive, and when default_op_applicable_flag is equal to 1, the nested SEI messages also apply to the default sub-bitstream.

Figure 3:
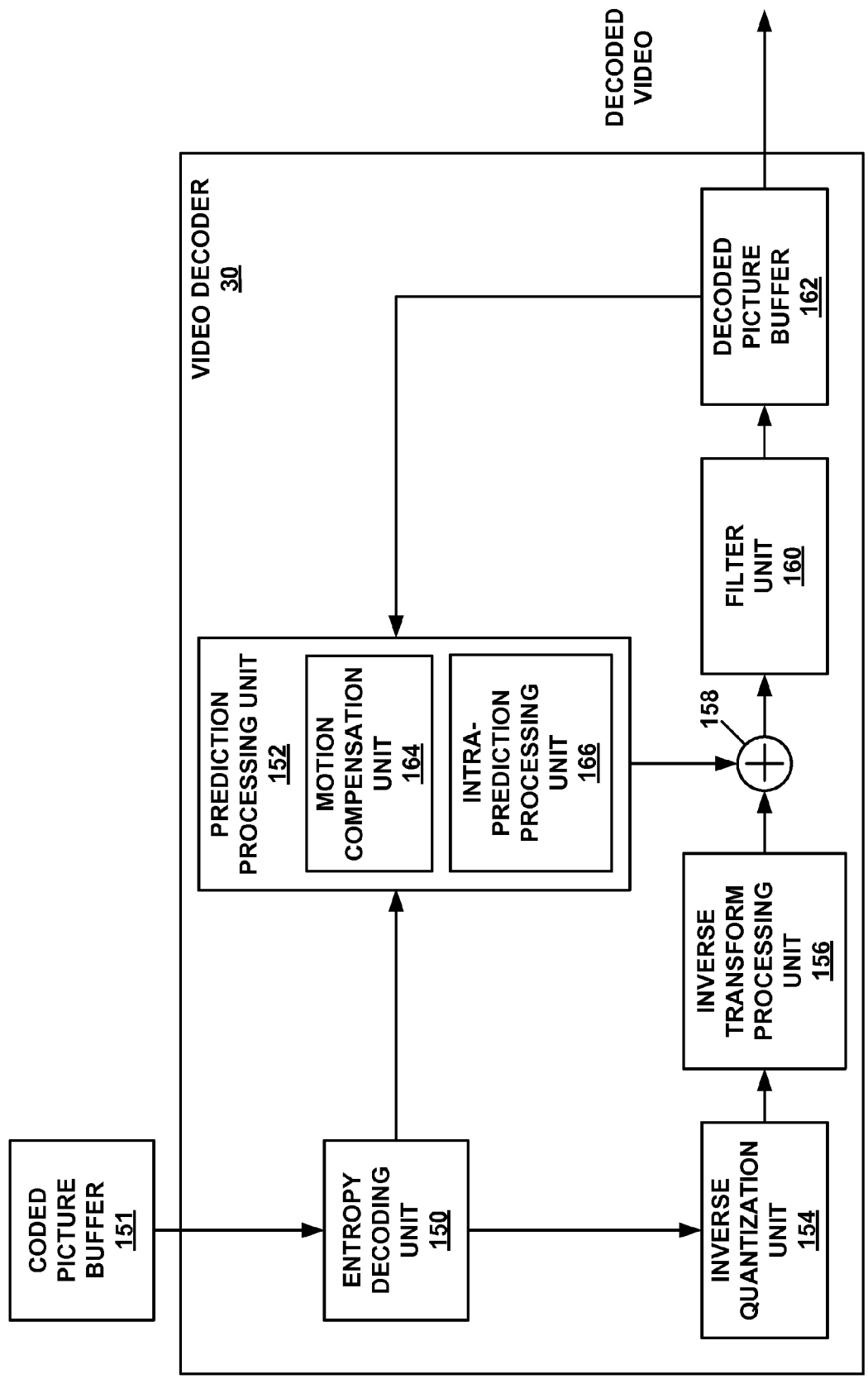
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 4:
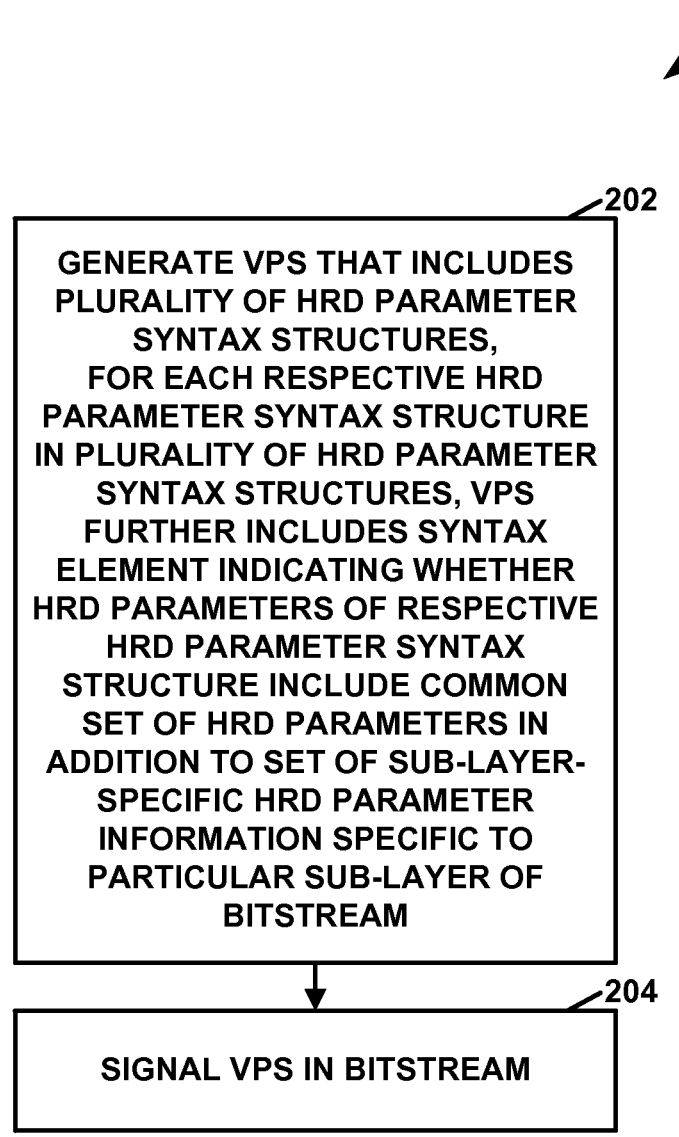
FIG. 4 is a flowchart illustrating an example operation of a video encoder, in accordance with one or more techniques of this disclosure.

FIG. 4 is a flowchart illustrating an example operation 200 of video encoder 20, in accordance with one or more techniques of this disclosure. In the example of FIG. 4, video encoder 20 may generate a VPS that includes a plurality of HRD parameter syntax structures that each include HRD parameters (202). For each respective HRD parameter syntax structure in the plurality of HRD parameter syntax structures, the VPS further includes a syntax element indicating whether the HRD parameters of the respective HRD parameter syntax structure include a common set of HRD parameters in addition to a set of sub-layer-specific HRD parameter information specific to a particular sub-layer of the bitstream, wherein the common set of HRD parameters is common to all sub-layers of the bitstream. Furthermore, video encoder 20 may signal the VPS in the bitstream (204).

Figure 5:
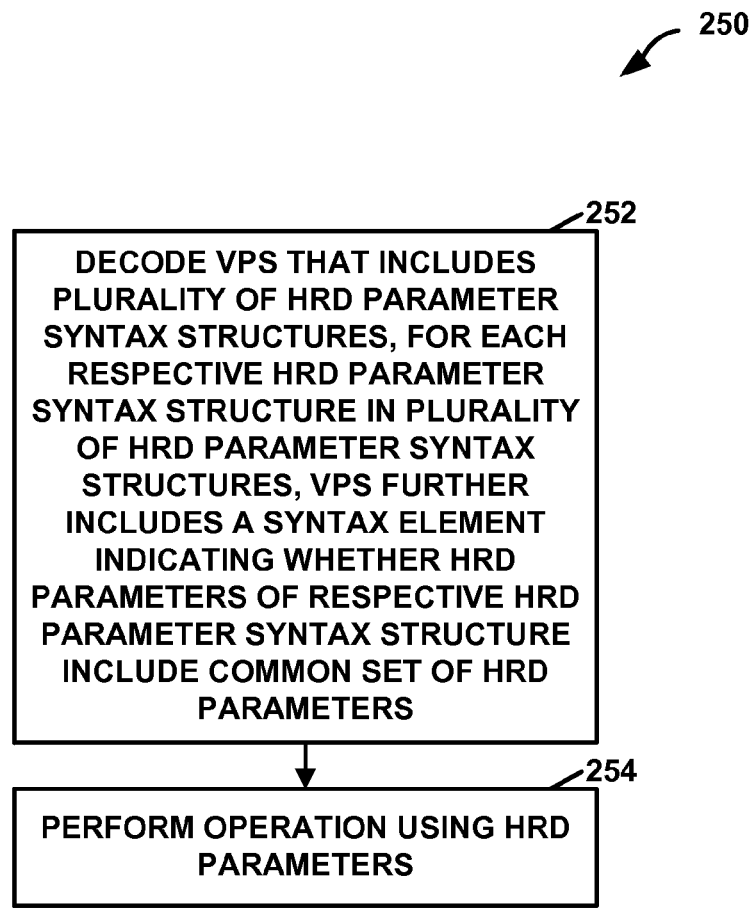
FIG. 5 is a flowchart illustrating an example operation of a device, in accordance with one or more techniques of this disclosure.

FIG. 5 is a flowchart illustrating an example operation 250 of a device, in accordance with one or more techniques of this disclosure. Operation 250 may be performed by video encoder 20, video decoder 30, or another device. As illustrated in the example of FIG. 5, the device may decode, from a bitstream, a VPS that includes a plurality of HRD parameter syntax structures that each include HRD parameters (252). For each respective HRD parameter syntax structure in the plurality of HRD parameter syntax structures, the VPS further includes a syntax element indicating whether the HRD parameters of the respective HRD parameter syntax structure include a common set of HRD parameters.

Furthermore, the device may perform an operation using the HRD parameters of at least one of the HRD parameter syntax structures (254). In some examples, the bitstream may comprise an operation point representation of a particular operation point, a particular HRD parameter syntax structure may be applicable to the particular operation point, and the device may perform the operation using the HRD parameters of the particular HRD parameter syntax structure. For example, the device may use the HRD parameters to perform a bitstream conformance test that determines whether an operation point applicable to the HRD parameter syntax structure conforms to a video coding standard, such as HEVC. In another example, the device may use the HRD parameters to perform a decoder conformance test.

The common set of HRD parameters may be common to all sub-layers of the bitstream. In some examples, the HRD parameters of each HRD parameter syntax structure include a set of sub-layer-specific HRD parameters that is specific to a particular sub-layer of the bitstream. In some examples, each of the sets of sub-layer-specific HRD parameters includes a syntax element (e.g., indicating a temporal distance between HRD output times of any two consecutive pictures in output order, a syntax element indicating a number of alternative coded picture buffer specifications in the bitstream of a coded video sequence. In some examples, when the device determines that a particular HRD parameter syntax structure does not include a common set of HRD parameters, the device may perform the operation using a common set of HRD parameters associated with a previous HRD parameter syntax structure and the set of sub-layer-specific HRD parameters of the particular HRD parameter syntax structure.

Figure 6:
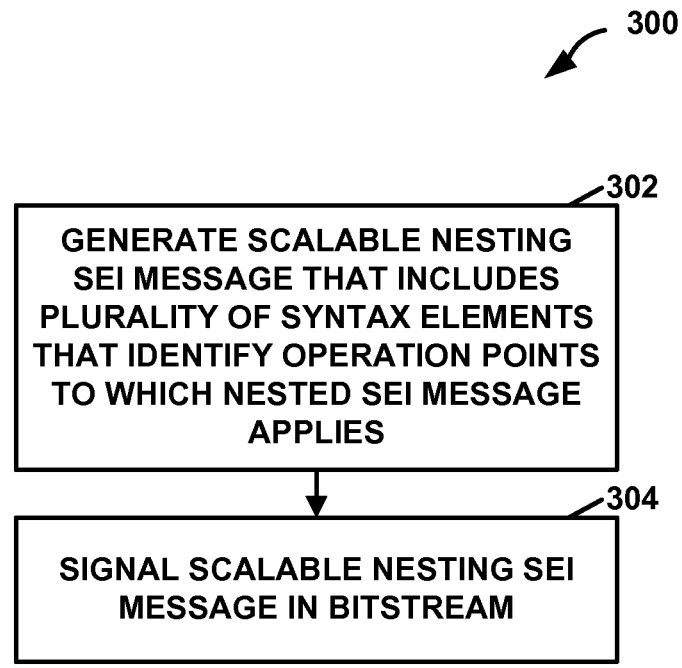
FIG. 6 is a flowchart illustrating an example operation of a video encoder, in accordance with one or more techniques of this disclosure.

FIG. 6 is a flowchart illustrating an example operation 300 of video encoder 20, in accordance with one or more techniques of this disclosure. As illustrated in the example of FIG. 6, video encoder 20 may generate a scalable nesting SEI message that includes a plurality of syntax elements that identify a plurality of operation points to which a nested SEI message encapsulated by the scalable nesting SEI message applies (302). Furthermore, video encoder 20 may signal the scalable nesting SEI message in a bitstream (304).

Figure 7:
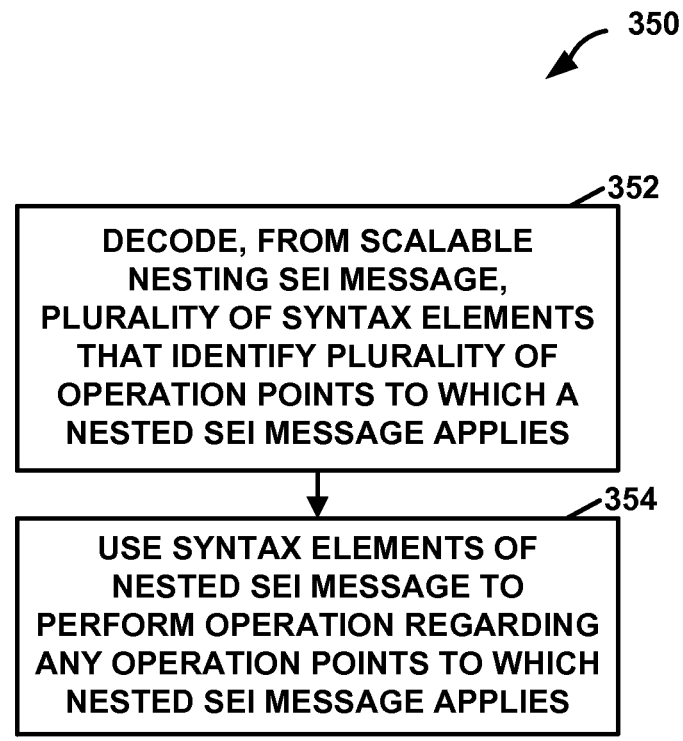
FIG. 7 is a flowchart illustrating an example operation of a device, in accordance with one or more techniques of this disclosure.

FIG. 7 is a flowchart illustrating an example operation 350 of a device, in accordance with one or more techniques of this disclosure. Video encoder 20, video decoder 30, or another device may perform operation 350. As illustrated in the example of FIG. 7, a device may decode, from a scalable nesting SEI message, a plurality of syntax elements that identify a plurality of operation points to which a nested SEI message encapsulated by the scalable nesting SEI message applies (352). In some examples, the device may decode, from the scalable nesting SEI message, a syntax element (e.g., nesting_num_ops_minus1) indicating whether the scalable nesting SEI message includes the plurality of syntax elements that identify the operation points Furthermore, the device may use one or more syntax elements of the nested SEI message to perform an operation regarding any of the operation points to which the nested SEI message applies (354). For example, the device may use syntax elements of the nested SEI message in a bitstream conformance test that determines whether any of the operation points to which the nested SEI message applies conform to a video coding standard, such as HEVC. In another example, the device may use syntax elements of the nested SEI message to perform a decoder conformance test.

Figure 8:
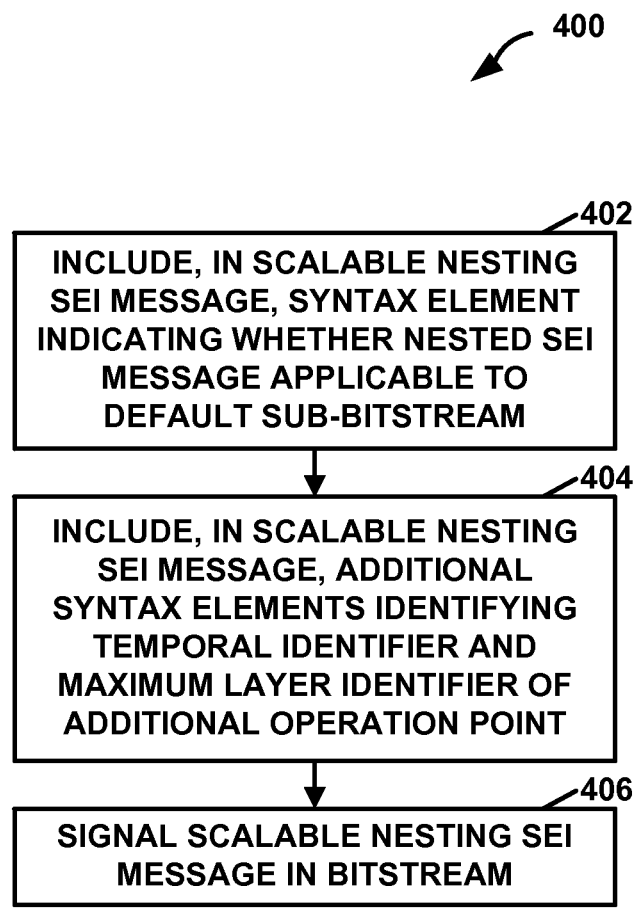
FIG. 8 is a flowchart illustrating an example operation of a video encoder, in accordance with one or more techniques of this disclosure.

FIG. 8 is a flowchart illustrating an example operation 400 of video encoder 20, in accordance with one or more techniques of this disclosure. As illustrated in the example of FIG. 8, video encoder 20 may include, in a scalable nesting SEI message encapsulated by an SEI NAL unit, a syntax element (e.g., default_op_applicable_flag) that indicates whether a nested SEI message encapsulated by the scalable nesting SEI message is applicable to a default sub-bitstream (402). The default sub-bitstream is an operation point representation of an operation point defined by a layer identifier specified in a NAL unit header of the SEI NAL unit and a temporal identifier specified in the NAL unit header. A first syntax element in the NAL unit header (e.g., nuh_reserved_zero_6 bits) may indicate the layer identifier and a second syntax element in the NAL unit header (e.g., nuh_reserved temporal_id_plus1) may indicate the temporal identifier.

In the example of FIG. 8, video encoder 20 may include, in the scalable nesting SEI message, one or more additional syntax elements that identify a temporal identifier of an additional operation point and a maximum layer identifier of the additional operation point (404). Furthermore, video encoder 20 may signal the scalable nesting SEI message in a bitstream (406). In some examples, the syntax element that indicates whether a nested SEI message encapsulated by the scalable nesting SEI message is applicable to the default sub-bitstream may be referred to as a first syntax element and video encoder 20 may include a second syntax element (e.g., bitstream_subset_flag) in the scalable nesting SEI message. The second syntax element may indicate whether nested SEI messages encapsulated by the scalable nesting SEI message apply to a sub-bitstream extracted from the bitstream or whether the nested SEI messages apply to specific layers and sub-layers of the bitstream. Video encoder 20 may include the first syntax element only when the second syntax element indicates that the nested SEI messages apply to the sub-bitstream extracted from the bitstream.

Figure 9:
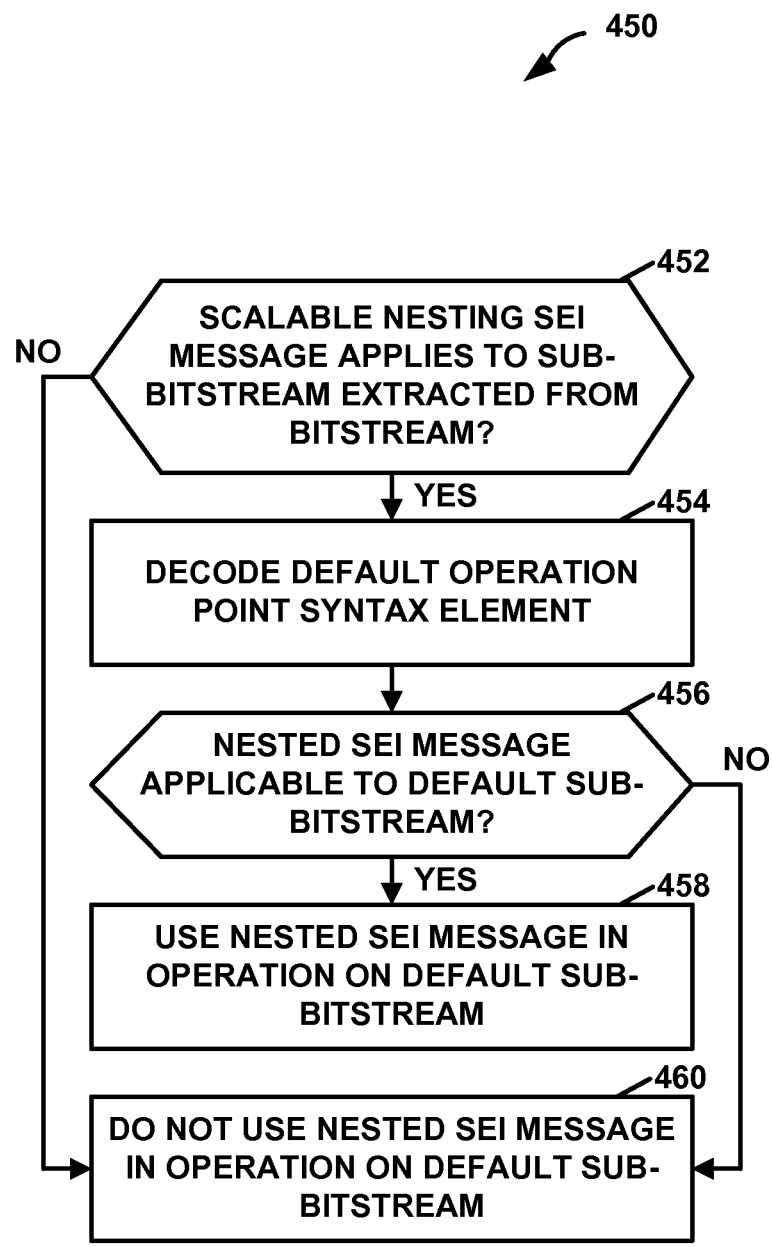
FIG. 9 is a flowchart illustrating an example operation of a device, in accordance with one or more techniques of this disclosure.

FIG. 9 is a flowchart illustrating an example operation 450 of a device, in accordance with one or more techniques of this disclosure. Video encoder 20, video decoder 30, or another device may perform operation 450. As illustrated in the example of FIG. 9, the device may determine, based at least in part on a first syntax element (e.g., bitstream_subset_flag) of a scalable nesting SEI message, whether a nested SEI message encapsulated by the scalable nesting SEI message applies to a sub-bitstream extracted from a bitstream (452). In response to determining that the nested SEI message encapsulated by the scalable nesting SEI message applies to a sub-bitstream extracted from a bitstream ("YES" of 452), the device may decode a default_operation point syntax element (e.g., default_op_applicable_flag) in the scalable nesting SEI message (454). The default operation point syntax element may indicate whether the nested SEI message encapsulated by the scalable nesting SEI message is applicable to a default sub-bitstream.

The default sub-bitstream may be an operation point representation of an operation point defined by a layer identifier specified in a NAL unit header of the SEI NAL unit and a temporal identifier specified in the NAL unit header. In some examples, a first syntax element in the NAL unit header (e.g., nuh_reserved_zero_6 bits) indicates the layer identifier and a second syntax element in the NAL unit header (e.g., nuh_reserved temporal_id_plus1) indicates the temporal identifier. The default sub-bitstream may be a subset of a bitstream and the default sub-bitstream does not include VCL NAL units of the bitstream that have layer identifiers greater than the layer identifier indicated by the first syntax element of the NAL unit header or have temporal identifiers greater than the temporal identifier indicated by the second syntax element of the NAL unit header.

Furthermore, the device may determine, based at least in part on a syntax element (e.g., default_op_applicable_flag) in the scalable nesting SEI message encapsulated by the SEI NAL unit, whether the nested SEI message encapsulated by the scalable nesting SEI message is applicable to a default sub-bitstream of the bitstream (456). In some examples, the scalable nesting SEI message encapsulates a plurality of nested SEI messages. In such examples, the device may determine, based on syntax element (e.g., default_op_applicable_flag), whether each of the nested SEI message in the scalable nesting SEI message is applicable to the default sub-bitstream.

When the nested SEI message is applicable to the default sub-bitstream ("YES" of 456), the device may use the nested SEI message in an operation on the default sub-bitstream (458). For example, the nested SEI message may include a set of HRD parameters. In this example, the device may use the HRD parameters in the nested SEI message in an operation that tests whether the default sub-bitstream conforms to a video coding standard, such as HEVC. In another example, the device may use the HRD parameters in the nested SEI message in a decoder conformance test. In another example, the device may use the nested SEI message in a decoding operation on the default sub-bitstream. In another example, initial CPB removal delays may be used to guide a system to set up an appropriate initial end-to-end delay and the DPB output times may be used to derive the RTP timestamps when the video is transported over RTP.

Otherwise, when the nested SEI message is not applicable to the default sub-bitstream ("NO" of 456) or when the scalable nesting SEI message does not apply to a sub-bitstream extracted from the bitstream ("NO" of 452), the device does not use the nested SEI message in an operation on the default sub-bitstream (460). For example, the device may determine, based on one or more additional syntax elements in the scalable nesting SEI message (e.g., nesting_max_temporal_id_plus1[i], nesting_op_idx[i], etc.) a temporal identifier of a second operation point and a maximum layer identifier of the second operation point. In this example, the device may use the nested SEI message in an operation on an additional sub-bitstream, the additional sub-bitstream being an operation point representation of the second operation point.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding, from an encoded video bitstream, a video parameter set (VPS) that includes a plurality of hypothetical reference decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of the encoded video bitstream, and wherein the first HRD parameter syntax structure included in the VPS includes the common set of HRD parameters; and
   performing an operation using the HRD parameters of at least one of the HRD parameter syntax structures.

2. The method of claim 1, further comprising:
   determining that a particular HRD parameter syntax structure in the plurality of HRD parameter syntax structures does not include the common set of HRD parameters, and
   wherein performing the operation using the HRD parameters of at least one of the HRD parameter syntax structures comprises performing the operation using the common set of HRD parameters included in a previous HRD parameter syntax structure in the plurality of HRD parameter syntax structures and additional HRD parameters of the particular HRD parameter syntax structure.

3. The method of claim 1, wherein a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS.

4. The method of claim 1, wherein at least one of the HRD parameter syntax structures included in the VPS does not include the common set of HRD parameters.

5. The method of claim 1, wherein each of the HRD parameter syntax structures is applicable to an operation point of the encoded video bitstream.

6. The method of claim 1, wherein at least one of the HRD parameter syntax structures is applicable to multiple operation points of the encoded video bitstream.

7. A video decoding device comprising:
   a memory configured to store data, the data including an encoded video bitstream; and
   one or more processors configured to:
      decode, from the encoded video bitstream, a video parameter set (VPS) that includes a plurality of hypothetical reference decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of the encoded video bitstream, wherein the first HRD parameter syntax structure included in the VPS includes the common set of HRD parameters; and perform an operation using the HRD parameters of at least one of the HRD parameter syntax structures.

8. The video decoding device of claim 7, wherein the one or more processors are further configured to:

determine that a particular HRD parameter syntax structure in the plurality of HRD parameter syntax structures does not include the common set of HRD parameters, and perform the operation using the common set of HRD parameters included in a previous HRD parameter syntax structure in the plurality of HRD parameter syntax structures and additional HRD parameters of the particular HRD parameter syntax structure.

9. The video decoding device of claim 7, wherein a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS.

10. The video decoding device of claim 7, wherein at least one of the HRD parameter syntax structures included in the VPS does not include the common set of HRD parameters.

11. The video decoding device of claim 7, wherein each of the HRD parameter syntax structures is applicable to an operation point of the encoded video bitstream.

12. The video decoding device of claim 7, wherein at least one of the HRD parameter syntax structures is applicable to multiple operation points of the encoded video bitstream.

13. A video decoding device comprising:

means for decoding, from an encoded video bitstream, a video parameter set (VPS) that includes a plurality of hypothetical reference decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of the encoded video bitstream, and wherein the first HRD parameter syntax structure included in the VPS includes the common set of HRD parameters; and means for performing an operation using the HRD parameters of at least one of the HRD parameter syntax structures.

14. The video decoding device of claim 13, wherein:

a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS, and each of the HRD parameter syntax structures is applicable to an operation point of the encoded video bitstream.

15. A non-transitory computer-readable storage medium that stores instructions that, when executed by a video decoding device, configure the video decoding device to:

decode, from an encoded video bitstream, a video parameter set (VPS) that includes a plurality of hypothetical reference decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of the encoded video bitstream, and wherein the first HRD parameter syntax structure included in the VPS includes the common set of HRD parameters; and perform an operation using the HRD parameters of at least one of the HRD parameter syntax structures.

16. The non-transitory computer-readable storage medium of claim 15, wherein:

a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS, and each of the HRD parameter syntax structures is applicable to an operation point of the encoded video bitstream.

17. A method of encoding video data, the method comprising:

generating a video parameter set (VPS) that includes a plurality of Hypothetical Reference Decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of an encoded video bitstream comprising encoded pictures of the video data, and wherein the first HRD parameter syntax structure included in the VPS includes the common set of HRD parameters; and signaling the VPS in the encoded video bitstream.

18. The method of claim 17, wherein a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS.

19. The method of claim 17, wherein at least one of the HRD parameter syntax structures included in the VPS does not include the common set of HRD parameters.

20. A video encoding device comprising:

a data storage medium configured to store video data; and one or more processors configured to:

generate a video parameter set (VPS) that includes a plurality of Hypothetical Reference Decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of an encoded video bitstream that comprises encoded pictures of the video data, and wherein the first HRD parameter syntax structure included in the VPS includes the common set of HRD parameters; and signal the VPS in the encoded video bitstream.

21. The video encoding device of claim 20, wherein a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS.

22. The video encoding device of claim 20, wherein at least one of the HRD parameter syntax structures included in the VPS does not include the common set of HRD parameters.

23. A video encoding device comprising:
means for generating a video parameter set (VPS) that includes a plurality of Hypothetical Reference Decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of an encoded video bitstream that comprises encoded pictures of video data, and wherein the first HRD parameter syntax structure included in the VPS includes the common set of HRD parameters; and
means for signaling the VPS in the encoded video bitstream.

24. The video encoding device of claim 23, wherein:
a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS, and
each of the HRD parameter syntax structures is applicable to an operation point of the encoded video bitstream.

25. A non-transitory computer-readable storage medium that stores instructions that, when executed by a video encoding device, configure the video encoding device to:
generate a video parameter set (VPS) that includes a plurality of Hypothetical Reference Decoder (HRD) parameter syntax structures that each include HRD parameters, wherein for each respective HRD parameter syntax structure in the plurality of HRD parameter syntax structures other than the first HRD parameter syntax structure included in the VPS, the VPS further includes a syntax element indicating whether the HRD parameters of the respective HRD parameter syntax structure include a common set of HRD parameters, wherein the common set of HRD parameters is common to all sub-layers of an encoded video bitstream that comprises encoded pictures of video data, and wherein the first HRD parameter syntax structure included in the VPS includes the common set of HRD parameters; and signal the VPS in the encoded video bitstream.

26. The non-transitory computer-readable storage medium of claim 25, wherein:
a subsequent HRD parameter syntax structure included in the VPS includes the common set of HRD parameters, wherein the common set of HRD parameters included in the subsequent HRD parameter syntax structure is different from the common set of HRD parameters included in the first HRD parameter syntax structure included in the VPS, and
each of the HRD parameter syntax structures is applicable to an operation point of the encoded video bitstream.

27. The video decoding device of claim 7, wherein the video decoding device comprises at least one of:
an integrated circuit;
a microprocessor; or
a wireless communication device.

28. The video encoding device of claim 20, wherein the video encoding device comprises at least one of:
an integrated circuit;
a microprocessor; or
a wireless communication device.

29. The video decoding device of claim 7, further comprising a display configured to display the decoded video data.

30. The video encoding device of claim 20, further comprising a camera configured to capture the video data.

31. The method of claim 1, wherein each of the HRD parameter syntax structures always includes a set of sub-layer-specific HRD parameter information specific to a particular sub-layer of the encoded video bitstream.

32. The video decoding device of claim 7, wherein each of the HRD parameter syntax structures always includes a set of sub-layer-specific HRD parameter information specific to a particular sub-layer of the encoded video bitstream.

33. The method of claim 17, wherein each of the HRD parameter syntax structures always includes a set of sub-layer-specific HRD parameter information specific to a particular sub-layer of the encoded video bitstream.

34. The video encoding device of claim 20, wherein each of the HRD parameter syntax structures always includes a set of sub-layer-specific HRD parameter information specific to a particular sub-layer of the encoded video bitstream.

35. The video encoding device of claim 25, wherein each of the HRD parameter syntax structures always includes a set of sub-layer-specific HRD parameter information specific to a particular sub-layer of the encoded video bitstream.

36. The non-transitory computer-readable storage medium of claim 25, wherein each of the HRD parameter syntax structures always includes a set of sub-layer-specific HRD parameter information specific to a particular sub-layer of the encoded video bitstream.

* * * * *